UNITED STATES PATENT OFFICE.

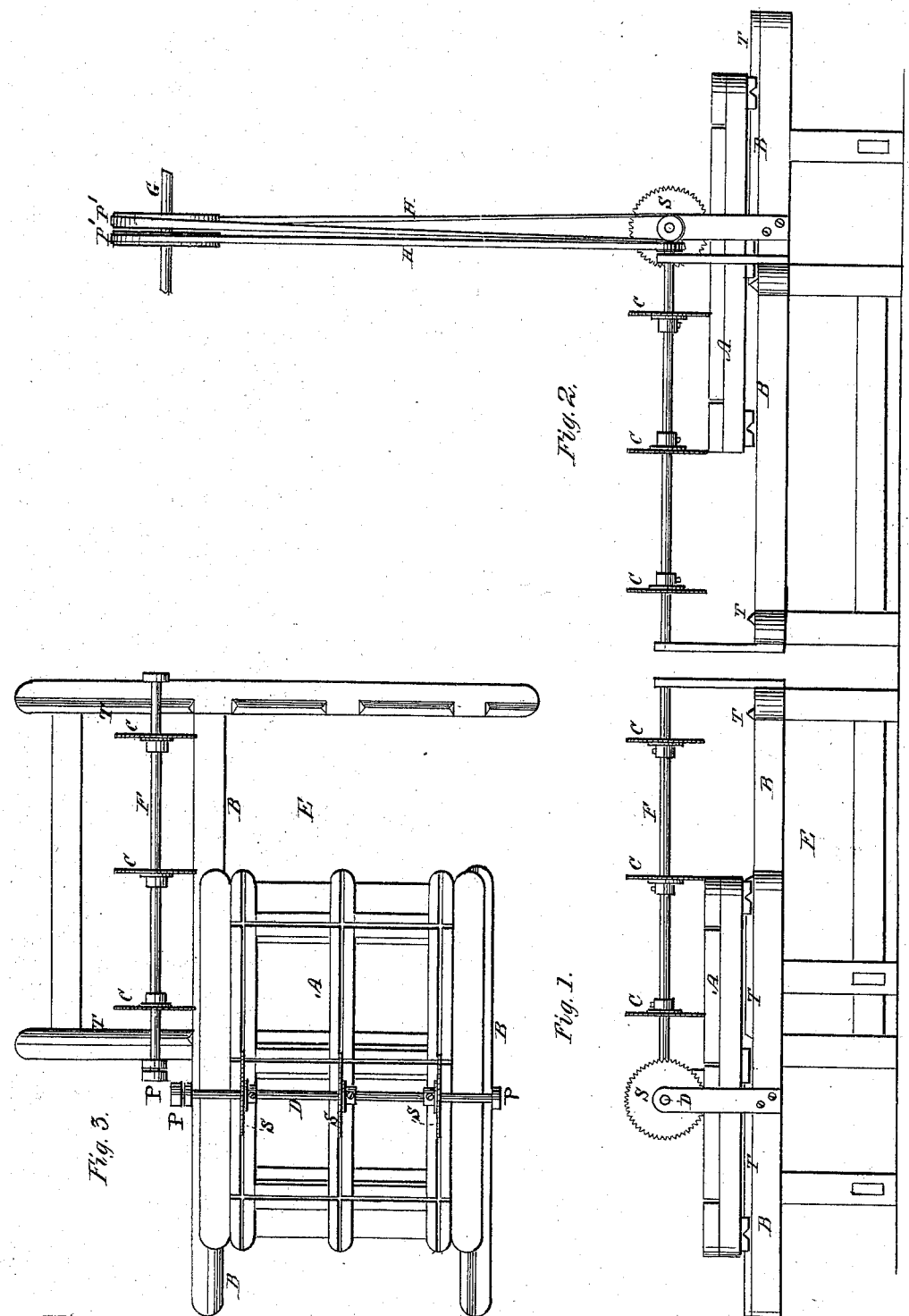

JAMES EACHUS, OF COATESVILLE, PENNSYLVANIA.

IMPROVEMENT IN SAWING-MACHINES.

Specification forming part of Letters Patent No. 142,154, dated August 26, 1873; application filed February 23, 1872.

*To all whom it may concern:*

Be it known that I, JAMES EACHUS, of Coatesville, in the county of Chester, State of Pennsylvania, have invented a new and useful Machine for Cutting Paper Boards, of which the following is a specification:

The nature of my invention consists in combining six adjustable circular saws upon two shafts, set at any angle to each other, and a two-way carriage supported by a frame, and provided with guides so as to work easily and carry the material to be cut. The object of the invention is to trim and cut heavy paper used in the manufacture of books and boxes.

Figure 1 is a front view of my invention; Fig. 2, a side elevation; and Fig. 3, a ground plan.

In Fig. 3, E is the frame, which should be strongly constructed and in the form of an L. B B and T T are guides on frame E. A is a two-way carriage, constructed in such a manner as to play freely upon guides B B and T T. D and F are saw-shafts mounted upon adjustable bearings bolted to frame E. C C C and S S S are circular saws, secured upon shafts D and F by adjustable collars.

For the purpose of operating my machine, shafts D and F are provided with pulleys P P. Rotation is communicated by belts H H, Fig. 2, from a shaft, G, on which are pulleys P' P'.

Upon carriage A, Fig. 3, is placed the wet paper to be cut. The pile is composed of a number of large sheets, as they are taken from the paper-machine. The carriage is then drawn upon the guides B B, saws S S S cutting through the paper; thence at right angles to the first direction upon guides T T, saws C C C cutting through the pile in the new direction, the result of the operation being to trim the edges and cut each sheet in four.

The saws can be adjusted upon shafts D and F, so as to trim and cut the sheets to any desired size.

I make no claim to the arrangement of circular saws and carriages working upon guides for the purpose of cutting logs, blocks of wood, wood of any kind, or any other material except paper; but

I claim—

The combination of shaft D, shaft F, saws S S S and C C C, carriage A, and frame E, for the purpose of cutting binders' and box-makers' paper, substantially as shown and described.

JAMES EACHUS. [L. S.]

Witnesses:
LEWIS BURKE. [L. S.]
LEE WELCH. [L. S.]